United States Patent [19]

Shepherd, Sr.

[11] 4,243,240
[45] Jan. 6, 1981

[54] STEERING STABILIZER FOR MOTOR VEHICLES

[75] Inventor: William W. Shepherd, Sr., Lithonia, Ga.

[73] Assignee: International Safety Industries Ltd., Atlanta, Ga.

[21] Appl. No.: 937,101

[22] Filed: Aug. 28, 1978

[51] Int. Cl.³ .................................. B62D 1/00
[52] U.S. Cl. ..................... 280/94; 267/150
[58] Field of Search .............. 280/89, 94, 267, 268, 280/269; 267/150

[56] References Cited

U.S. PATENT DOCUMENTS

| 1,167,240 | 1/1916 | Wood | 280/94 |
|---|---|---|---|
| 1,284,179 | 11/1918 | Coombs | 280/94 |
| 1,447,757 | 3/1923 | Cannon | 280/94 |
| 3,833,235 | 9/1974 | Worsham | 280/94 |
| 3,848,885 | 11/1974 | Hefren | 267/150 |

Primary Examiner—John J. Love
Assistant Examiner—John A. Carroll
Attorney, Agent, or Firm—Robert B. Kennedy

[57] ABSTRACT

A steering stabilizer for a motor vehicle having a steerable wheel rotatably mounted to each side of the vehicle centerline and coupled with a steering mechanism. The stabilizer comprises a housing and means for mounting the housing to the vehicle steering mechanism. A pair of compression rings are positioned within the housing. A coupler is movably mounted to the housing with a portion of the coupler positioned between and in spring biased engagement with the compression springs. Means are provided for fastening the coupler to the vehicle at points to each side of the vehicle centerline.

5 Claims, 4 Drawing Figures

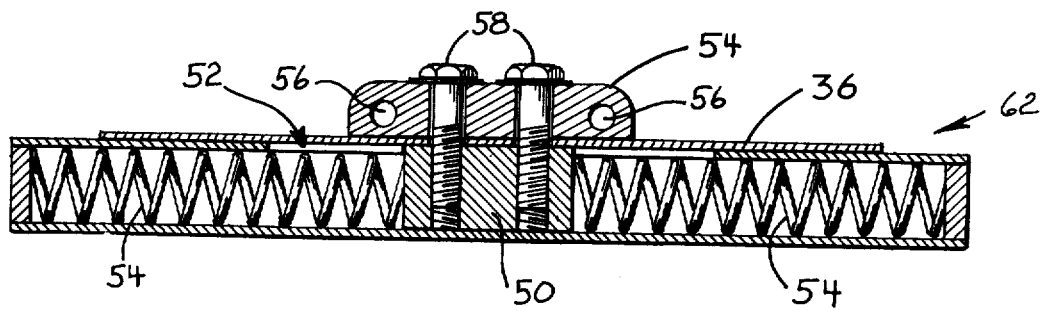
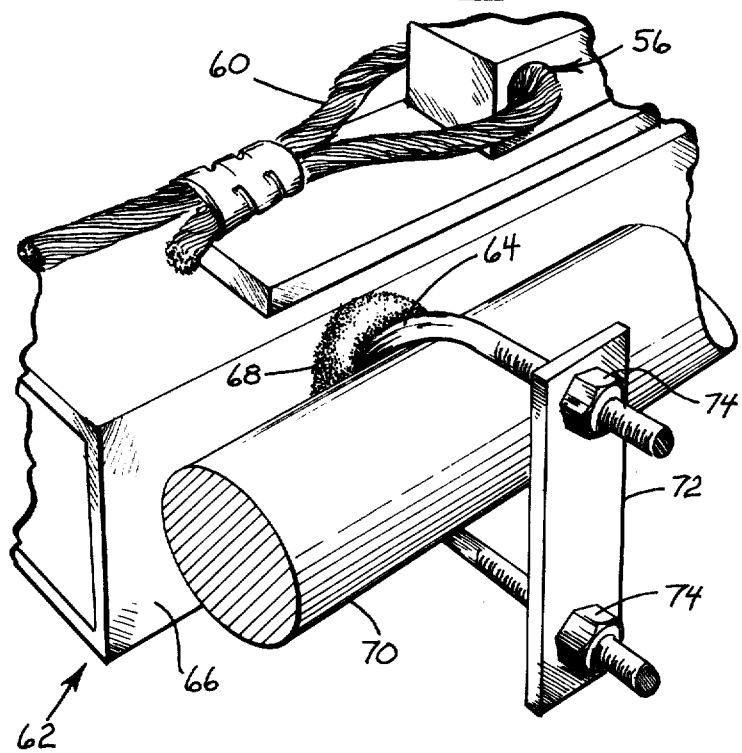

STEERING STABILIZER FOR MOTOR VEHICLES

FIELD OF THE INVENTION

This invention relates to steering stabilizers for motor vehicles.

BACKGROUND OF THE INVENTION

Steering stabilizers have long been provided for motor vehicles as exemplified in U.S. Pat. Nos. 1,119,014, 1,447,757, 1,564,662, 1,625,224, 2,132,304, 3,075,785 and 3,980,315. Generally these stabilizers provide means for biasing the steerable vehicle wheels towards a centered, no-turn position with the wheels rotating about a common axis normal to the path of vehicle travel. Should the vehicle encounter road turbulance as by hitting an object in the roadway over which it is travelling, or by one of its tires blowing out, a centering force is exerted by the stabilizer upon the wheels to bring them to the centered position. Similarly the stabilizer also tends to center the steerable wheels whenever the driver manually releases the control steering wheel while in a turn.

Though the just described stabilizers have played a very beneficial role in enhancing vehicle safety they have not been without problems and limitations. For example, many vehicles are not originally equipped with stabilizers by the manufacturer. They therefore have to be equipped with means for vehicle attachment. The attachment means however have not permitted rapid mounting nor have they been designed so as to easily accomodate vehicles of differing sizes and configurations. Once mounted they often have also provided insufficient clearance over the roadway whereby they have been subject to damage by infrequent contact with the roadway itself. Their longivity has also been limited due to their exposure to the elements and changing environmental conditions during vehicle operations. Where housings have been used to protect the stabilizer working parts, they have had to include a flexible member which has tended to degrade over extended periods of time. They also have often failed to perform smoothly but rather have operated abruptly in a rather jarring manner.

Accordingly, it is a general object of the present invention to provide an improved steering stabilizer for a motor vehicle.

More specifically, it is an object of the invention to provide a steering stabilizer for a motor vehicle of relatively simple and economic construction.

Another object of the invention is to provide a steering stabilizer for a motor vehicle which may be readily mounted thereto, with facility.

Yet another object of the invention is to provide a steering stabilizer which is continuously protected from adverse ambient conditions and in such fashion so as not to require the use of a flexible and degradable housing or housing member.

Still another object of the invention is to provide a steering stabilizer of the type described which functions in a smooth but positive and reliable manner.

SUMMARY OF THE INVENTION

In one form of the invention a steering stabilizer is provided for a motor vehicle having a steerable wheel rotatably mounted to each side of the vehicle centerline and coupled with a steering mechanism. The stabilizer comprises a housing and means for mounting the housing to the vehicle steering mechanism. A pair of compression springs is positioned within the housing. A coupler is movably mounted to the housing with a portion of the coupler positioned between and in spring biased engagement with the compression springs. Means are also provided for fastening the coupler to the vehicle at points to each side of the vehicle centerline.

BRIEF DESCRIPTION OF THE DRAWING

FIG. 3 is a cross-sectional view of the steering stabilizer embodying principles of the invention in an alternative form.

FIG. 4 is a perspective view of an external portion of the stabilizer depicted in FIG. 3 showing an alternative mounting means from that of the stabilizer shown in FIGS. 1 and 2.

DESCRIPTION OF THE PREFERRED EMBODIMENTS

Figure 1:
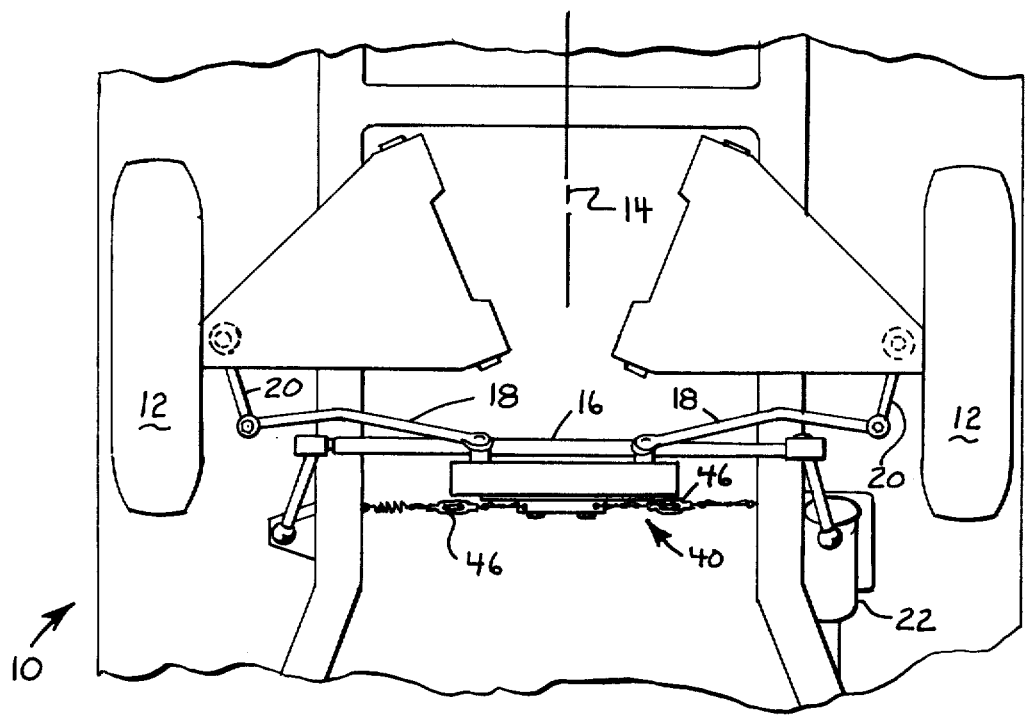
FIG. 1 is a bottom view of a portion of a motor vehicle with a steering stabilizer embodying principles of the present invention shown mounted thereto.
Figure 2:
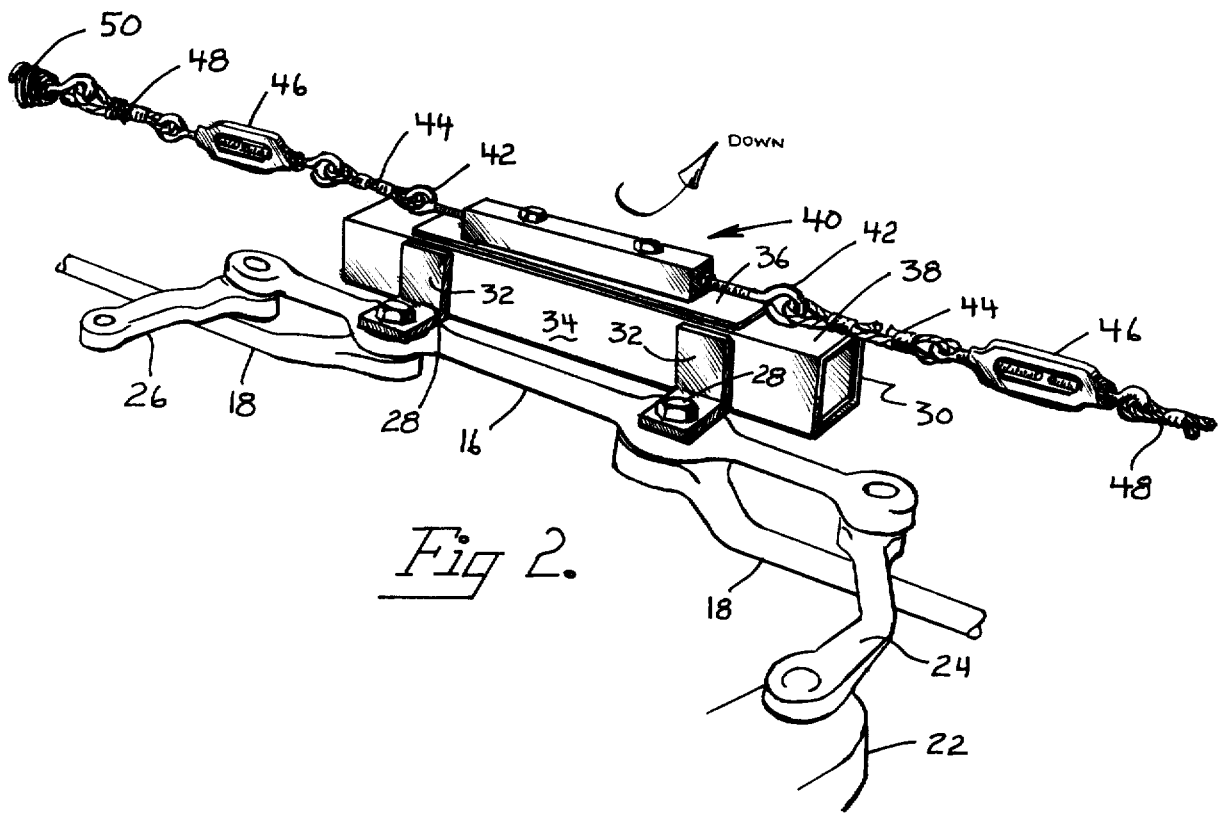
FIG. 2 is a perspective view of the steering stabilizer illustrated in FIG. 1 looking in a generally downward direction.

Referring now in more detail to the drawings, there is shown in FIGS. 1 and 2 the undercarriage of an automobile 10 having a pair of wheels 12 rotatably mounted to each side of the vehicle centerline 14. The wheels 12 are seen to be coupled with a steering mechanism comprising a tie bar 16 coupled with to a pair of arms 18 which in turn are pivoted to a pair of control knuckles 20. The tie rod 16 is coupled with a pair of arms 18 by bolts 28 which extend through aligned holes within the tie rod and arms. One end of the tie rod 16 is coupled with a steering column 22 by a control arm 24. The other end of the tie rod is coupled with a drag link 26.

With continued reference to FIG. 2 in particular the steering stabilizer is seen to include a closed metallic housing 30 that is mounted to the steering mechanism by a pair of angle irons mounted to the housing top 34. These angle irons provide a pair of flanges which define holes spaced mutually apart a distance to receive bolts 28 therethrough. The rearwardly facing side 38 of the housing defines a slot 52 which is shown in FIG. 3, which is completely covered by a cover 36. The cover is rigidly connected to and forms an integral part of a coupler 40 shown in alternate forms in FIGS. 2 and 3. A portion of the coupler extends to the exterior of the housing through the housing slot through which it is mounted. A short length of cable 44 connects each eye bolt to a tie-buckle 46. Sections 48 are connected to anchor points located to each side of the centerline 14. If desired, a pair of tension springs 50 may also be included in this fastening means.

In FIG. 3 it is seen that an internal, integral portion 50 of the coupler is located beneath the cover 38 and extends downwardly through slot 52 into the housing interior. A pair of compression springs 54 is located within the housing in spring biased engagement with opposed sides of the block portion 50 of the coupler. The internal portion of the coupler of FIG. 2 may also assume this same configuration.

In FIG. 3 the external portion of the coupler includes a block 54 having a pair of mutually spaced holes 56 straddling a pair of bolts 58 which extend through the cover and into block 50. Here lengths of cable 60 extend through the holes 56 as shown in FIG. 4 which cables are in turn secured to opposite sides of the vehicle chassis at opposite sides of the vehicle centerline.

In FIG. 4 the coupler here is seen to include alternative means for mounting stabilizer housing 62 to the vehicle steering mechanism. In this case the mounting means includes a set of U-bolts of which only one is here shown. The U-bolt has a bight portion 64 rigidly secured to housing side 66 by a weld 68. A pair of mutually parallel shank portions of the U-bolt extend from the bight spaced apart a distance to accomodate and receive therebetween a tie rod 70 of the vehicle steering mechanism. The housing is held fast to the tie rod by a mounting plate 72 having a pair of holes adopted to receive the U-bolt shanks and which are secured together by a pair of bolts 74. It will be understood that this arrangement enables the housing to be mounted at diverse locations to vehicle tie rods of diverse sizes. Preferably, however, it is mounted to the tie rod so as to place the center of the coupler along the centerline of the vehicle.

In operation whenever the steerable vehicle wheels are moved from their centered position the coupler will slide along the housing to one side or the other of the housing centerline. As this occurs one of the compression springs will commence to exert a greater force upon the coupler than the other compression spring thereby biasing the coupler back towards its centered position. In such an offset position it will be seen the cover 52 continuously overlays the housing slot. In this manner the interior of the stabilizer remains closed and protected from ambient weather conditions, from flying foreign objects and the like in all operative positions.

It should also be now appreciated that the stabilizer is an in-line type, is of relatively simple and economic structure, and may be readily mounted to preconstructed vehicles in a simple and quick manner.

It should be further understood that the just described embodiments merely illustrate principles of the invention in selected, preferred forms. Many modifications, deletions and additions may, of course, be made thereto without departure from the spirit and scope of the invention as set forth in the following claims.

I claim:

1. A steering stabilizer for a motor vehicle having a steerable wheel rotatably mounted to each side of the vehicle centerline and coupled with a steering mechanism, and with the stabilizer comprising, in combination, a housing mounted to the vehicle steering mechanism; a pair of compression springs positioned within said housing; a coupler movably mounted to said housing with a portion of the coupler positioned between and in spring biasing engagement with said compression springs and with said coupler being fastened to the vehicle frame to each side of the vehicle centerline by fastening means that includes a tension spring located at opposite sides of the vehicle centerline.

2. A steering stabilizer in accordance with claim 1 wherein said housing defines a slot through which said coupler extends.

3. A steering stabilizer for a motor vehicle having a steerable wheel rotatably mounted to each side of the vehicle centerline and coupled with a steering mechanism, and with the stabilizer comprising, in combination, a housing; means for mounting the housing to the vehicle steering mechanism; a pair of compression springs positioned within said housing; a coupler movably mounted to said housing with a portion of the coupler positioned between and in spring biasing engagement with said compression springs; means for fastening said coupler to the vehicle to each side of the vehicle centerline; and wherein said housing defines a slot through which said coupler extends and a cover overlaying said slot.

4. A steering stabilizer in accordance with claim 3 wherein said housing, coupler and pair of compression springs are sized to permit movement of said coupler a selected distance within said slot, and wherein said cover overlays portions of said housing adjacent opposite ends of said slot extending at least said selected distance whereby the cover fully covers the slot in all coupler positions.

5. A steering stabilizer for a motor vehicle having a steerable wheel rotatably mounted to each side of the vehicle centerline and coupled with a steering mechanism, and with the stabilizer comprising, in combination, a housing; means mounting the housing to the vehicle steering mechanism; a pair of compression springs positioned within said housing; a coupler movably mounted to said housing with a portion of the coupler positioned between and in spring biasing engagement with said compression springs; and means fastening said coupler to opposite sides of the vehicle frame including a pair of flexible cables having opposed ends, one end secured to said coupler and the other end secured to the vehicle frame.

* * * * *